United States Patent
Maehara et al.

(10) Patent No.: US 7,754,631 B2
(45) Date of Patent: Jul. 13, 2010

(54) ALKALI-FREE GLASS SUBSTRATE, METHOD FOR PRODUCING IT AND LIQUID CRYSTAL DISPLAY PANEL

(75) Inventors: Terutaka Maehara, Chiyoda-ku (JP); Manabu Nishizawa, Chiyoda-ku (JP); Junichiro Kase, Chiyoda-ku (JP); Syuji Matsumoto, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/349,559

(22) Filed: Jan. 7, 2009

(65) Prior Publication Data

US 2009/0176640 A1 Jul. 9, 2009

Related U.S. Application Data

(63) Continuation of application No. PCT/JP2007/063758, filed on Jul. 10, 2007.

(30) Foreign Application Priority Data

| Jul. 13, 2006 | (JP) | 2006-193278 |
| Nov. 7, 2006 | (JP) | 2006-301674 |
| Dec. 28, 2006 | (JP) | 2006-356287 |

(51) Int. Cl.
| C03C 3/087 | (2006.01) |
| C03C 3/091 | (2006.01) |
| C03C 3/083 | (2006.01) |
| C03C 3/085 | (2006.01) |
| C03C 3/078 | (2006.01) |

(52) U.S. Cl. .............. 501/70; 501/66; 501/68; 501/69; 501/72

(58) Field of Classification Search ............. 501/66, 501/67, 68, 69, 70, 72
See application file for complete search history.

(56) References Cited

U.S. PATENT DOCUMENTS

| 5,801,109 | A | * | 9/1998 | Nishizawa et al. ............ 501/66 |
| 6,169,047 | B1 | | 1/2001 | Nishizawa et al. |
| 6,313,052 | B1 | | 11/2001 | Nakashima et al. |
| 6,867,158 | B2 | * | 3/2005 | Peuchert et al. ............ 501/67 |
| 2001/0034293 | A1 | * | 10/2001 | Peuchert et al. ............ 501/66 |
| 2007/0027019 | A1 | * | 2/2007 | Nishizawa et al. ............ 501/65 |
| 2008/0076656 | A1 | | 3/2008 | Suzuki et al. |

FOREIGN PATENT DOCUMENTS

| JP | 9-169539 | 6/1997 |
| JP | 10-324526 | 12/1998 |
| JP | 11-314933 | 11/1999 |
| JP | 2004-277222 | 10/2004 |
| JP | 2004-299947 | 10/2004 |
| JP | 2005-162536 | 6/2005 |
| JP | 2005-330176 | 12/2005 |
| WO | WO-2005/063642 | * 7/2005 |

* cited by examiner

*Primary Examiner*—Karl E Group
*Assistant Examiner*—Noah S Wiese
(74) *Attorney, Agent, or Firm*—Oblon, Spivak, McClelland, Maier & Neustadt, L.L.P.

(57) ABSTRACT

To provide an alkali-free glass substrate, which has a high Young's modulus, a low linear expansion coefficient, a high strain point and a low density, does not devitrify in the float forming process and is excellent in acid resistance.

An alkali-free glass substrate, which contains neither alkali component nor BaO and consists essentially of, as represented by mol % based on oxide, from 57.0 to 65.0% of $SiO_2$, from 10.0 to 12.0% of $Al_2O_3$, from 6.0 to 9.0% of $B_2O_3$, from 5.0 to 10.0% of MgO, from 5.0 to 10.0% of CaO and from 2.5 to 5.5% of SrO, provided that MgO+CaO+SrO is from 16.0 to 19.0%, MgO/(MgO+CaO+SrO)$\geq$0.40, and $B_2O_3/(SiO_2+Al_2O_3+B_2O_3)\leq$0.12; wherein Young's modulus $\geq$75 GPa; the linear expansion coefficient at from 50 to 350° C. is from $30\times10^{-7}/°$ C. to $40\times10^{-7}/°$ C.; the strain point $\geq$640° C.; the temperature $T_2$ (the viscosity $\eta$ satisfies log $\eta$=2)$\leq$1,620° C.; the temperature $T_4$ (the viscosity $\eta$ satisfies log $\eta$=4)$\leq$1,245° C.; the devitrification temperature $\leq T_4$; and weight loss per unit area is at most 0.6 mg/cm$^2$, when immersed in 0.1N HCl at 90° C. for 20 hours.

8 Claims, No Drawings

ALKALI-FREE GLASS SUBSTRATE, METHOD FOR PRODUCING IT AND LIQUID CRYSTAL DISPLAY PANEL

TECHNICAL FIELD

The present invention relates to an alkali-free glass substrate, a method for producing it, and a liquid crystal display panel

BACKGROUND ART

Heretofore, the following properties have been required for a glass substrate to be used for various displays, particularly for a glass substrate for liquid crystal displays designed to have a thin film of a metal or oxide formed on its surface.

(1) It contains substantially no alkali metal ion (i.e. it is alkali-free glass). If a glass substrate contains alkali metal oxides, alkali metal ions are likely to diffuse into the above thin film thereby to deteriorate the properties of the thin film.

(2) It has a high strain point, so as to minimize deformation of the glass substrate and shrinkage (heat shrinkage) accompanied by stabilization of the glass structure when exposed to a high temperature during the process for forming the thin film.

(3) It has adequate chemical durability against various chemicals to be used for formation of semiconductors. Especially, it has the chemical durability against buffered hydrofluoric acid (BHF: hydrofluoric acid+ammonium fluoride) to be used for etching of $SiO_x$ or $SiN_x$, chemicals containing hydrochloric acid to be used for etching of ITO (tin-doped indium oxide), various acids (e.g. nitric acid, sulfuric acid) to be used for etching of a metal electrode, or a resist-removing basic liquid.

(4) It has no defects (e.g. bubbles, stria, inclusions, pits or flaws) inside or on the surface.

In recent years, along with the display size being larger, a glass satisfying the following properties as well as the above, has been desired.

(5) A display has been required to have its weight reduced, and glass itself has been also desired to be a glass having a low density.

(6) As a method for reducing the weight of a display, it has been desired to reduce the thickness of a glass substrate.

(7) A glass has been desired to have a linear expansion coefficient which is at the same level as conventional alkali-free glass so that conventional process and facilities can be used in production process of a liquid crystal display.

(8) As liquid crystal TV sets are widely used and are made to have a large size, a glass substrate has been required to have a large rectangular area of at least 2 m on a side from 1 m on a side of a conventional glass substrate. When a display using such a large substrate is to be prepared, handling is difficult due to a large sag by its own weight at the time of transportation and handling, and therefore, the glass substrate has been required to be little sagged.

(9) A glass substrate has been required to have a high strength so as not to be broken by an external force or shock exerted during the use of the liquid crystal display product.

As an alkali-free glass proposed in order to meet such requirements, one disclosed in Patent Documents 1 and 2 may, for example, be mentioned.

Patent Document 1 discloses an alkali-free glass, which has a strain point of at least 640° C. and consists essentially of, as represented by mol %, from 60 to 73% of $SiO_2$, from 5 to 16% of $Al_2O_3$, from 5 to 12% of $B_2O_3$, from 0 to 6% of MgO, from 0 to 9% of CaO, from 1 to 9% of SrO and from 0 to less than 1% of BaO, provided that MgO+CaO+SrO+BaO is from 7 to 18%.

Further, it is described that such an alkali-free glass can be formed by a float process, white stain due to buffered hydrofluoric acid (BHF) can be prevented, it is excellent in acid resistance, the heat resistance is high, the linear expansion coefficient is low, and the density is remarkably small.

Further, Patent Document 2 discloses an alkali-free glass, which contains essentially no alkali metal oxide and consists essentially of, as represented by mol %, from at least 60 to less than 66% of $SiO_2$, from 0 to 12% of $Al_2O_3$, from 5 to 10% of $B_2O_3$, from 0 to 18% of MgO, from 0 to 18% of CaO, from 0 to 18% of SrO and from 0 to 6% of BaO, provided that CaO+SrO is from 10 to 25%, and MgO+CaO+SrO+BaO is from 15.5 to 30%.

Further, it is described that such an alkali-free glass is excellent in reduction resistance, whereby it can be preferably formed by a float process, various problems such as deterioration of a devitrification property due to that a glass surface is influenced by a reduction reaction at a time of a float process have been solved, the density is small, the strain point is high, the linear expansion coefficient is low, and the Young's modulus is high.

Patent Document 1: JP-A-9-169539
Patent Document 2: JP-A-2005-330176

DISCLOSURE OF THE INVENTION

Problems to be Solved by the Invention

As mentioned above, alkali-free glass substrates used as glass substrates are required to have various properties. Among them, along with glass substrates being large sized in recent years, it is particularly important that sag is little, as mentioned in the above (8).

Further, since glass substrates are being large sized, in addition to the above properties, a property to form a glass melt having a low viscosity in a melting step in a glass production process is required. If the viscosity of the glass melt is high, it is difficult to homogenize the glass composition, whereby in a float process for forming a large size glass substrate, it is difficult to improve flatness of the glass substrate. Further, it is difficult to obtain glass having few bubbles. On the other hand, if the temperature of molten glass is raised in order to lower the viscosity, the temperature of glass ribbons cast into a float forming step becomes high, and inconveniences thereby result from the viewpoint of facilities of the float forming step and productivity.

In order to obtain a glass substrate excellent in such properties, namely in homogeneity and flatness, and having few bubbles, it is an object of the present invention to provide an alkali-free glass substrate which, even though its glass welting temperature at a time of melting glass and forming glass is relatively low, has small sag, a low linear expansion coefficient, a high strain point and a low density, and is free from devitrification in its float forming and excellent in acid resistance.

Namely, in order to reduce sag of a glass substrate, even though it is a large size glass, it is an object of the present invention to provide an alkali-free glass substrate satisfying properties such that the Young's modulus is at least 75 GPa, preferably at least 79 GPa, the linear expansion coefficient (at from 50 to 350° C.) is from $30 \times 10^{-7}$ to $40 \times 10^{-7}/°$ C., the strain point is at least 640° C., the density is at most 2.60 $g/cm^3$, the temperature $T_2$ in which the viscosity η satisfies log η=2 is lower than 1,630° C. ($T_2 < 1,630$° C.), preferably at most 1,620° C. ($T_2 \leqq 1,630°$ C.), the temperature $T_4$ in which the viscosity η satisfies log η=4 is less than 1,260° C. ($T_4 < 1,260°$ C.), preferably at most 1,250° C. ($T_4 \leqq 1,250°$ C.), more preferably at most 1,245° C. ($T_2 \leqq 1,245°$ C.), the devitrification temperature is at most $T_4$, and weight loss per unit area which is used as an index of acid resistance, when the glass is immersed in 0.1N (normality) for 20 hours, is at most 0.6 mg/cm².

Further, it is an object of the present invention to provide a liquid crystal display panel which employs such an alkali-free glass substrate. Further, it is an object of the present invention to provide a method for producing such an alkali-free glass substrate.

Means of Solving the Problems

The present inventors have conducted extensive studies, and as a result, have found that an alkali-free glass substrate having the above properties wherein respective components are within specific ranges, and the contents of respective components have specific relations, is most suitable particularly as a glass substrate for liquid crystal displays. Thus, the present invention has been accomplished.

The present invention provides the following (a) to (h).

(a) An alkali-free glass substrate, which contains substantially no alkali component or BaO and consists essentially of, as represented by mol % based on oxide, from 57.0 to 65.0% of $SiO_2$, from 10.0 to 12.0% of $Al_2O_3$, from 6.0 to 9.0% of $B_2O_3$, from 5.0 to 10.0% of MgO, from 5.0 to 10.0% of CaO and from 2.5 to 5.5% of SrO, provided that MgO+CaO+SrO is from 16.0 to 19.0%, MgO/(MgO+CaO+SrO)$\geqq$0.40, and $B_2O_3/(SiO_2+Al_2O_3+B_2O_3) \leqq 0.12$; wherein Young's modulus $\geqq$75 GPa; the linear expansion coefficient at from 50 to 350° C. is from $30 \times 10^{-7}/°$ C. to $40 \times 10^{-7}/°$ C.; the strain point $\geqq$640° C.; the temperature $T_2$ (the viscosity η satisfies log η=2)$\leqq$1,620° C.; the temperature $T_4$ (the viscosity η satisfies log η=4)$\leqq$1,245° C.; the devitrification temperature $\leqq T_4$; and weight loss per unit area is at most 0.6 mg/cm², when immersed in 0.1N HCl at 90° C. for 20 hours.

(b) The alkali-free glass substrate according to the above (a), which consists essentially of, as represented by mol % based on oxide, from 60.0 to 65.0% of $SiO_2$, from 10.0 to 12.0% of $Al_2O_3$, from 6.0 to 9.0% of $B_2O_3$, from 5.5 to 8.5% of MgO, from 5.0 to 10.0% of CaO and from 2.5 to 5.5% of SrO, provided that MgO+CaO+SrO is from 16.0 to 18.5%, MgO/(MgO+CaO+SrO)$\geqq$0.40, and $B_2O_3/(SiO_2+Al_2O_3+B_2O_3)\leqq 0.12$.

(c) The alkali-free glass substrate according to the above (a) or (b), which contains from 500 ppm to 1.0 weight % of $SnO_2$.

(d) A liquid crystal display panel, which comprises at least one alkali-free glass substrate as defined in the above (a).

(e) A method for producing an alkali-free glass substrate, which comprises melting glass materials so as to form a glass composition which contains neither alkali component nor BaO and consists essentially of, as represented by mol % based on oxide, from 57.0 to 65.0% of $SiO_2$, from 10.0 to 12.0% of $Al_2O_3$, from 6.0 to 9.0% of $B_2O_3$, from 5.0 to 10.0% of MgO, from 5.0 to 0.0% of CaO and from 2.5 to 5.5% of SrO, provided that MgO+CaO+SrO is from 16.0 to 19.0%, MgO/(MgO+CaO+SrO)$\geqq$0.40, and $B_2O_3/(SiO_2+Al_2O_3+B_2O_3)\geqq 0.12$, followed by forming by a float process, wherein the temperature to melt the glass materials is lower than 1,630° C., and the maximum temperature of the glass melt at an inlet of a float bath is 1,250° C.

(f) The method for producing an alkali-free glass substrate according to the above (e), which comprises melting glass materials so as to form a glass composition which contains neither alkali component nor BaO and consists essentially of, as represented by mol % based on oxide, from 60.0 to 65.0% of $SiO_2$, from 10.0 to 12.0% of $Al_2O_3$, from 6.0 to 9.0% of $B_2O_3$, from 5.5 to 8.5% of MgO, from 5.0 to 10.0% of CaO and from 2.5 to 5.5% of SrO; MgO+CaO+SrO is from 16.0 to 18.5%, MgO/(MgO+CaO+SrO)$\geqq$0.40, and $B_2O_3/(SiO_2+Al_2O_3+B_2O_3)\leqq 0.12$, followed by forming by a float process, wherein the temperature to melt the glass materials is lower than 1,620° C., and the maximum temperature of the glass melt at an inlet of a float bath is 1,245° C.

(g) The method for producing an alkali-free glass substrate according to the above (e), wherein the glass materials contain from 0.1 to 1.0 weight % of $SnO_2$.

(h) The method for producing an alkali-free glass substrate according to the above (e), wherein the glass materials further contain from 0.1 to 1.0 weight % of $SnO_2$, and the method comprises a melting step 1 of heating the glass materials at a temperature of from 1,450 to 1,580° C. to form molten glass and a melting step 2 subsequent to the melting step 1, of heating the molten glass at a temperature of at least 1,500° and lower than 1,630° C. to remove bubbles, wherein the temperature of the molten glass in the melting step 2 is higher by at least 30° C. than the temperature of the glass melt in the melting step 1.

EFFECT OF THE INVENTION

According to the present invention, it is possible to provide an alkali-free glass substrate having a high Young's modulus (at least 75 GPa, preferably at least 79 GPa), a low linear expansion coefficient at from 50 to 350° C. ($30 \times 10^{-7}/°$ C. to $40 \times 10^{-7}/°$ C.) a high strain point (at least 640° C.), a low density (at most 2.60 g/cm³), a low viscosity (the temperature $T_2$ (the viscosity η satisfies log η=2) is lower than 1,630° C., preferably at most 1,620° C., and the temperature $T_4$ (the viscosity η satisfies log η=4) is lower than 1,260° C., preferably at most 1,250° C., more preferably at most 1,245° C.) and which is not devitrified in a float process (the devitrification temperature $\leqq T_4$) and excellent in acid resistance (weight loss per unit area is at most 0.6 mg/cm², when immersed in 0.1N HCl at 90° C. for 20 hours). In the case of the alkali-free glass substrate of the present invention, the sag is small, the glass composition is homogeneous, and a higher flatness can be obtained. Further, since its viscosity is low, bubbles will readily surface at a time of melting glass, whereby an alkali-free glass substrate having few bubbles can be obtained.

Further, a liquid crystal display panel employing such an alkali-free glass substrate and which is highly fine and has a high contrast ratio, can be provided. Further, the temperature to melt glass is lower than 1,630° C., preferably at most 1,620° C., and the temperature of the glass melt at the inlet of the float bath is lower than 1,260° C., preferably at most 1,250° C., more preferably at most 1,245° C., whereby a method for producing an alkali-free glass substrate which can save energy, can be provided.

BEST MODE FOR CARRYING OUT THE INVENTION

The alkali-free glass substrate of the present invention will be described.

The alkali-free glass substrate of the present invention (hereinafter, referred to as the glass substrate of the present invention) consists essentially of $SiO_2$, $Al_2O_3$, $B_2O_3$, MgO, CaO and SrO. Further, other components, particularly alkali components (alkali metal elements such as Li, Na, K, Rb, Cs and Fr and compounds containing at least one alkali metal element) and BaO are not substantially contained.

Here, "not substantially contained" means not contained except for impurities unavoidably included from materials. Further, a part of a fining agent used in a process for producing the glass substrate of the present invention or its reaction product, etc. may be contained.

Further, the contents (%) of respective components contained in the glass substrate of the present invention are represented by the following mol % based on oxide. Hereinafter, unless otherwise specified, "%" which shows a content means "mol %".

The glass substrate of the present invention contains $SiO_2$ in an amount of from 57.0 to 66.0%, preferably from 57.0 to 65%, more preferably from 59.0 to 65.0%, further preferably from 60.0 to 65.0%.

When the content of $SiO_2$ is high, the density of the glass substrate of the present invention becomes low, such being desirable. However, if the content of $SiO_2$ is too high, the devitrification property may sometimes deteriorate. Further, if the content is too low, it may sometimes result that the acid resistance deteriorates, the density increases, the strain point becomes low, the linear expansion coefficient increases, and the Young's modulus becomes low.

Further, the glass substrate of the present invention contains $Al_2O_3$ in an amount of from 6.0 to 15.0%, preferably from 7.0 to 14.0%, more preferably from 8.0 to 13.0%, further preferably from 9.0 to 12.0%, further more preferably from 10.0 to 12.0%, particularly preferably from 10.5 to 11.5%.

When $Al_2O_3$ is contained in such an amount, phase separation can be suppressed, the strain point can be made high, and the Young's modulus can be made high. If the content is too high, the devitrification property, the hydrochloric acid resistance and the BHF resistance may sometimes deteriorate.

Further, the glass substrate of the present invention contains $B_2O_3$ in an amount of from 3.0 to 12.0%, preferably from 4.0 to 11.0%, more preferably from 5.0 to 10.0%, further preferably from 6.0 to 9.0%, particularly preferably from 6.5 to 8.5%.

When $B_2O_3$ is contained in such an amount, the density can be lowered, the BHF resistance can be improved, the melting reaction property of glass can be improved, and the devitrification property can be improved. If such a content is too high, the Young's modulus may sometimes be decreased, and the acid resistance may sometimes deteriorate.

In order that the glass substrate for a liquid crystal display can have a more preferred high strain point and a lower linear expansion coefficient, the total amount of $SiO_2$, $Al_2O_3$ and $B_2O_3$ is preferably at least 80%, more preferably at least 80.5%, further preferably at least 81%.

Further, the glass substrate of the present invention contains MgO in an amount of from 3.0 to 12.0%, preferably from 4.0 to 11.0%, more preferably from 5.0 to 10.0%, further preferably from 5.5 to 10.0%, particularly preferably from 6.5 to 8.5%.

When MgO is contained in such an amount, the density is lowered, the melting reaction property is improved, the linear expansion coefficient is not increased, and the strain point is not lowered. If such a content is too high, phase separation of glass may sometimes occur, and the devitrification property and the acid resistance may sometimes deteriorate.

Further, the glass substrate of the present invention contains CaO in an amount of from 3.0 to 12.0%, preferably from 4.0 to 11.0%, more preferably from 5.0 to 10.0%, further preferably from 5.5 to 10.0%, particularly preferably from 6.0 to 8.0%.

When CaO is contained in such an amount, the density is lowered, the linear expansion coefficient is not increased, the strain point is not lowered, the melting reaction property is improved, the viscosity is lowered, the devitrification property is improved, the acid resistance is improved, and phase separation is suppressed. If such a content is too high, the linear expansion coefficient and the density may sometimes increase.

Further, the glass substrate of the present invention contains SrO in an amount of from 1.5 to 8.0%, preferably from 2.0 to 7.0%, more preferably from 2.5 to 6.0%, further preferably from 2.5 to 5.5%, particularly preferably from 2.5 to 4.0%.

When SrO is contained in such an amount, the density is not increased, the linear expansion coefficient is not increased, the strain point is not lowered, the viscosity is lowered, phase separation is suppressed, the melting reaction property is not lowered, and the devitrification and the acid resistance are improved. If the content of SrO is too high, the devitrification property may sometimes deteriorate, the linear expansion coefficient may sometimes increase, the density may sometimes increase, and the acid resistance may sometimes deteriorate.

Further, the total content (mol %) of MgO, CaO and SrO in the glass substrate of the present invention, namely, MgO+CaO+SrO, is from 15.0 to 20.0%, preferably from 15.5 to 19.5%, more preferably from 16.0 to 19.0%, further preferably from 16.5 to 19.0%.

When the contents of the respective components are within the above ranges, and MgO+CaO+SrO is within such a range, in the case where the glass substrate of the present invention is in a molten state, the viscosity becomes low. Namely, with respect to the viscosity η which is the index at the time of melting glass, the temperature $T_2$ which satisfies log η=2 is lower than 1,630° C., preferably at most 1,620° C. Namely, the higher the temperature of the glass melt is, the lower the viscosity is, however, even though the temperature of the glass melt is relatively low such that $T_2$ of the glass melt is lower than 1,630° C., preferably at most 1,620° C., its viscosity (η) can be $10^2$ dPa·s (the index viscosity at a time of melting). Further, the surfacing velocity of bubbles in molten glass becomes high, and bubbles in an alkali-free glass to be obtained can be reduced. Therefore, in the glass substrate of the present invention, the glass melt can be easily homogenified.

Further, with respect to the viscosity η which is the index in the float process, the temperature $T_4$ which satisfies log η=4 is lower than 1,260° C., preferably at most 1,250° C., more preferably at most 1,245° C., further preferably at most 1,235° C. Namely, even though the temperature $T_4$ of the glass melt is lower than 1,260° C., preferably at most 1,250° C., more preferably at most 1,245° C., further preferably at most 1,235° C., its viscosity (η) can be $10^4$ dPa·s (the viscosity as an index for forming property). Therefore, in the float forming process, etc., the flatness of the glass substrate can be easily improved.

When the total amount of MgO+CaO+SrO is large, the viscosity becomes low. However, if the total amount exceeds 20%, the linear expansion coefficient may increase, the strain point may be lowered, and the acid resistance may deteriorate. With a view to controlling the linear expansion coefficient to be low, the total amount of MgO+CaO+SrO is particularly preferably from 16.0 to 18.5%.

Conventional alkali-free glass substrates do not have the above Young's modulus range (at least 75 GPa), the above linear expansion coefficient range ($30\times10^{-7}$ to $40\times10^{-7}/°$ C.), the above strain point range (at least 640° C.), the above density range (at most 2.60 g/cm$^3$) and a property for forming a glass melt having the above low viscosity. Namely, in order that the glass has the viscosity of $10^2$ dPa·s, which is the index at the time of melting and the viscosity of $10^4$ dPa·s, which is the index for a forming property, the temperature of the glass melt is required to be at least 1,630° C. and at least 1,260° C. respectively, as described in Patent Document 1.

On the other hand, in the glass substrate of the present invention, the melting temperature and the temperature of glass ribbons in the float forming process can be lower than the temperatures in conventional methods, whereby energy to be used for heating, etc. can be reduced, and it is advantageous from the viewpoint of cost. When $T_4$ is at most 1,245° C., preferably at most 1,235° C., the float forming process can be easily carried out, and a flat glass substrate can be obtained with little defect such as dross or top speck, whereby an amount of polishing a surface of the glass substrate after the float process can be reduced. Further, the devitrification temperature is at most $T_4$, whereby devitrified contamination is not formed, and the float forming can be stably carried out. In a case where large size glass substrates are produced, such properties are particularly preferred. Since as mentioned above, in recent years, it is desired to produce glass substrate having a rectangular shape of which one side is at least 2 m, an alkali-free glass substrate having such properties is desired.

Further, the ratio of the content (mol %) of MgO to the total content (mol %) of MgO+CaO+SrO, namely MgO/(MgO+CaO+SrO), is at least 0.25, preferably at least 0.30, more preferably at least 0.35, further preferably at least 0.40, particularly preferably at least 0.42 (hereinafter, this ratio is referred to as "ratio A").

When the above respective components are within the above ranges, and the ratio A is within such a range, the linear expansion coefficient at from 50 to 350° C. is from $30\times10^{-7}/°$ C. to $40\times10^{-7}/°$ C. Accordingly, when liquid crystal displays are produced by using the glass substrate of the present invention, without changing conventional process and facilities, displays having little patterning deflection can be efficiently produced.

Further, the ratio of the content (mol %) of $B_2O_3$ to the total content (mol %) of $SiO_2+Al_2O_3+B_2O_3$, namely $B_2O_3/(SiO_2+Al_2O_3+B_2O_3)$, is at most 0.12, preferably at most 0.11, more preferably at most 0.10, particularly preferably at most 0.095 (hereinafter, this ratio is referred to as "ratio B").

When the above respective components are within the above ranges, and the ratio A and the ratio B are within such ranges, a glass substrate having a Young's modulus of at least 75 GPa can be obtained. Accordingly, even when the glass substrate of the present invention is made to be a large size glass substrate having about 2 m$^2$, the amount of sag can be reduced, such being desirable.

The glass substrate of the present invention is an alkali-free glass substrate having the above composition. A preferred composition is summarized below.

As represented by mol % based on oxide, the contents of respective components are from 57.0 to 65.0% of $SiO_2$,
from 10.0 to 12.0% of $Al_2O_3$,
from 6.0 to 9.0% of $B_2O_3$,
from 5.0 to 10.0% of MgO,
from 5.0 to 10.0% of CaO
and from 2.5 to 5.5% of SrO, provided that MgO+CaO+SrO is from 16.0 to 19.0%, MgO/(MgO+CaO+SrO)≧0.40, and $B_2O_3/(SiO_2+Al_2O_3+B_2O_3)$≦0.12.

Further, a more preferred composition is summarized below.

As represented by mol % based on oxide, the contents of respective components are from 60.0 to 65.0% of $SiO_2$,
from 10.0 to 12.0% of $Al_2O_3$,
from 6.0 to 9.0% of $B_2O_3$,
from 5.5 to 8.5% of MgO,
from 5.0 to 10.0% of CaO
and from 2.5 to 5.5% of SrO, provided that MgO+CaO+SrO is from 16.0 to 18.5%, MgO/(MgO+CaO+SrO)≧0.40, and $B_2O_3/(SiO_2+Al_2O_3+B_2O_3)$≦0.12.

The glass substrate of the present invention has the above composition and all properties that the Young's modulus ≧75 GPa, preferably the Young's modulus ≧79 GPa; the linear expansion coefficient at from 50 to 350° C. is from $30\times10^{-7}/°$ C. to $40\times10^{-7}/°$ C.; the strain point ≧640° C.; the density is at most 2.60 g/cm$^3$; the temperature $T_2$ (the viscosity η satisfies log η=2)<1,630° C., preferably $T_2$≦1,620° C.; the temperature $T_4$ (the viscosity η satisfies log η=4)<1,260° C., preferably $T_4$≦1,250° C., more preferably $T_4$≦1,245° C.; the devitrification temperature ≦$T_4$; and as the index of the acid resistance, weight loss per unit area is at most 0.6 mg/cm$^2$, when immersed in 0.1N HCl at 90° C. for 20 hours.

The Young's modulus of the glass substrate of the present invention is at least 75 GPa, preferably at least 76 GPa, more preferably at least 77 GPa, further preferably at least 79 GPa, particularly preferably at least 80 GPa.

Further, the linear expansion coefficient at a temperature of from 50 to 350° of the glass substrate of the present invention is from $30\times10^{-7}$ to $40\times10^{-7}/°$ C., preferably from $32\times10^{-7}$ to $40\times10^{-7}/°$ C., more preferably from $35\times10^{-7}$ to $39\times10^{-7}/°$ C.

Further, the strain point of the glass substrate of the present invention is at least 640° C., preferably at least 650° C., more preferably at least 655° C.

Further, the density of the glass substrate of the present invention is at most 2.60 g/cm$^3$, preferably at most 2.55 g/cm$^3$, more preferably at most 2.52 g/cm$^3$.

Further, the temperature $T_2$ at which the viscosity η satisfies log η=2 of the glass substrate of the present invention is lower than 1,630° C., preferably at most 1,620° C., more preferably at most 1,610° C., further preferably at most 1,605° C.

Further, the temperature $T_4$ at which the viscosity η satisfies log η=4 of the glass substrate of the present invention is lower than 1,260° C., preferably at most 1,250° C., more preferably at most 1,245° C., further preferably at most 1,240° C., particularly preferably at most 1,235° C.

Further, in the glass substrate of the present invention, as the index of the acid resistance, weight loss per unit area is at most 0.6 mg/cm$^2$, when immersed in 0.1N HCl at 90° C. for 20 hours, however, it is preferably at most 0.3 mg/cm$^2$, particularly preferably at most 0.2 mg/cm$^2$.

Further, in the present invention, the Young's modulus, the linear expansion coefficient at a temperature of from 50 to 350° C., the strain point, the density, the temperature $T_2$ at which the viscosity η satisfies log η=2 and the temperature $T_4$ at which the viscosity η satisfies log η=4 mean values measured by the following methods respectively.

The Young's modulus is a value obtained in accordance with a resonance method (JIS R1602).

The linear expansion coefficient at a temperature of from 50 to 350° C. is a value measured by using a thermomechanical analyzer (TMA).

The strain point is a value measured in accordance with JIS R3103.

The density is a value obtained by using a density meter using Archimedes principle.

The temperature $T_2$ at which the viscosity $\eta$ satisfies log $\eta=2$ and the temperature $T_4$ at which the viscosity $\eta$ satisfies log $\eta=4$ are values measured by using a rotation viscometer.

The devitrification temperature is an average value of the maximum temperature at which crystals precipitate and the minimum temperature at which crystals do not precipitate, when the glass piece is heated for 17 hours.

As the index of acid resistance, weight loss per unit area (mg/cm$^2$) when glass is immersed in 0.1N HCl at 90° C. for 20 hours, is used.

The glass substrate of the present invention may, for example, be produced by the following method.

First, usually used materials (as a case requires, a few types of materials) are prepared so as to form the composition (the desired composition) of the glass substrate of the present invention.

Here, a fining agent may be contained. As the fining agent F, Cl, SO$_3$, SnO$_2$, TiO$_2$, MnO$_2$, CeO$_2$, ZrO$_2$, Fe$_2$O$_3$ or Nb$_2$O$_5$ may, for example, be mentioned. When the fining agent is contained, by its defoaming effect, bubbles in the glass substrate of the present invention after forming can be further reduced. Such a fining agent can be added singly, or two types or more may be used in combination. Among such fining agents, SnO$_2$ is preferred. In addition to SnO$_2$, SO$_3$, Fe$_2$O$_3$, Cl or F may be preferably further contained. Because in the production process of the alkali-free glass of the present invention, defoaming clarification effects can be accelerated and improved. Such fining agents assist to remove bubbles by forming a large amount of bubbles and increasing sizes of bubbles in molten glass at a time of heating the material.

In a case where fining agents are added, their mass ratios (weight %) to the mass of the glass substrate of the present invention after forming are preferably such that F is from 0 to 1 weight %, Cl is from 0 to 1 weight %, SO$_3$ is from 0 to 1 weight %, SnO$_2$ is from 0 to 1 weight %, TiO$_2$ is from 0 to 1 weight %, MnO$_2$ is from 0 to 1 weight %, CeO$_2$ is from 0 to 1 weight %, ZrO$_2$ is from 0 to 1 weight % and Fe$_2$O$_3$ is from 0 to 1 weight %. However, since there is a problem such as excess formation of bubbles, deterioration of the devitrification property or coloration, the total amount is preferably at most 5 weight %. Further, in order to obtain the desired effect by addition, the amount of fining agents is preferably at least 10 ppm, more preferably at least 100 ppm, further preferably at least 0.1 weight %. Specifically, F+Cl+SO$_3$+SnO$_2$+TiO$_2$+MnO$_2$+CeO$_2$+ZrO$_2$+Fe$_2$O$_3$ is preferably from 10 ppm to 5 weight %, or F+Cl+SO$_3$+SnO$_2$+TiO$_2$+MnO$_2$+CeO$_2$+ZrO$_2$+Fe$_2$O$_3$ is preferably from 100 ppm to 1.0 weight %. For example, in a case where from 0.1 to 1.0 weight % of SnO$_2$ is added, in the glass substrate after formed, from 500 ppm to 1.0 weight % of SnO$_2$ is contained.

In a case where SnO$_2$ is used as the fining agent, at a time of heating and melting the glass material, SnO$_2$ is reduced to SnO as shown in the following formula (A), oxygen is formed, and the formed oxygen surfaces together with bubbles contained in molten glass to the surface of the molten glass.

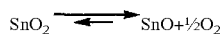

$$SnO_2 \rightleftarrows SnO + \tfrac{1}{2}O_2 \quad (A)$$

Next, such materials are continuously added to a melting furnace, and the materials are melted and become molten glass at a temperature of lower than 1,630° C., preferably at most 1,620° C., more preferably at most 1,500° C. to 1,610° C. (the maximum temperature is within the range of from 1,500° C. to 1,610° C.), further preferably at most 1,600° C., particularly preferably at most from 1,500° C. to 1,600° C. (the maximum temperature is within the range of from 1,500° C. to 1,600° C.). Since the viscosity of the glass substrate of the present invention is low as mentioned above, even though the glass is melted at a temperature of lower than 1,630° C., preferably at most 1,620° C., the glass can be homogenized to a level of conventional alkali-free glass substrates.

Here, in a case where SnO$_2$ is used as the fining agent, preferred is a method comprising a melting step 1 of heating the glass materials at from 1,450 to 1,580° C. to form molten glass, and after the melting step 1, a melting step 2 of heating the molten glass at least 1,500° C. to lower than 1,630° C. to remove bubbles in the glass, wherein the temperature of the molten glass in the melting step 2 is made higher by at least 30° C. than the temperature of the molten glass in the melting step 1 to form glass melt.

This preferred method will be described in detail.

First, industrial glass materials containing SnO$_2$ are prepared so as to be the alkali-free glass of the present invention.

Then, the prepared materials are continuously added in a melting furnace or the like, and heated and melted to obtain molten glass (melting step).

The melting step preferably contains a melting step 1 wherein the materials are added in a melting furnace or the like, and the materials are heated to form molten glass and the subsequent melting step 2 wherein the molten glass is further heated to remove bubbles in the glass. Accordingly, oxygens are generated at once by the reduction reaction of SnO$_2$, whereby an alkali-free glass having less bubbles can be obtained.

Further, the temperature of the molten glass in the melting step 2 (hereinafter, referred to as "reaching temperature") is preferably higher by at least 30° C. than the temperature at which the materials become molten glass in the melting step 1 (hereinafter, referred to as "initial temperature"). The reaching temperature is more preferably higher by at least 50° C., more preferably higher by at least 70° C., further preferably higher by at least 90° C.

The initial temperature which melts the materials in the melting step 1 is preferably from 1,450 to 1,580° C. In order to uniformly melt the materials, the initial temperature is more preferably at least 1,490° C., further preferably at least 1,530° C. On the other hand, in order to suppress generation of oxygen due to a reduction reaction of SnO$_2$, the initial temperature is preferably at most 1,570° C., further preferably at most 1,560° C.

The reaching temperature in the melting step 2 is preferably at least 1,500° C. and lower than 1,630° C. In a case where the reaching temperature is high, oxygen is generated at once by the reduction reaction of SnO$_2$, and the bubble surfacing velocity can be increased by lowering the viscosity $\eta$. The reaching temperature is more preferably at least 1,540° C., further preferably at least 1,580° C. On the other hand, if the reaching temperature is too high, problems may result such that energy consumption tends to be large, and life span of facilities tends to be short.

The reaching temperature is more preferably at most 1,620° C., further preferably at most 1,610° C.

In the melting steps, in order to make the temperature difference between the melting step 1 and the melting step 2 to be at least 30° C., methods may, for example, be mentioned such that (i) by using one melting furnace or the like, the melting step 1 and the melting step 2 are carried out while molten glass flows from the material charging side to the glass discharge side, (ii) one furnace or the like is used by dividing its internal into a material charging side and a glass discharge side and (iii) two melting furnaces or the like are used.

Types of a melting furnace or the like used in the melting steps 1 and 2, and a method for heating materials or molten glass are not particularly restricted.

The glass substrate of the present invention may be produced by melting glass materials containing a fining agent such as $SnO_2$, as a case requires, followed by carrying out the following float process, etc.

Then, the glass melt is formed into the predetermined plate thickness by the float process, annealed, cut into a desired size, grinded and polished. When the glass is formed by the float process, the temperature of the glass melt at the inlet of the float bath is lower than 1,260° C., preferably at most 1,100° C. and lower than 1,260° C. (the maximum temperature is within a range of from at least 1,100° C. to lower than 1,260° C.), more preferably at most 1,250° C., further preferably from at most 1,100 to 1,250° C. (the maximum temperature is within a range of from 1,100° C. to 1,250° C.), further preferably from at most 1,245°, further preferably at most 1,100° C. to 1,245° C. (the maximum temperature is within a range of from 1,100° C. to 1,245° C.), further preferably at most 1,235° C., further preferably from at most 1,100 to 1,235° C. (the maximum temperature is within a range of from 1,100° C. to 1,235° C.). As mentioned above, the temperature $T_4$ of the glass substrate of the present invention is low, whereby the float process can be easily carried out, and a flat glass substrate can be obtained. Further, there are also advantages on facilities for the float process and productivity.

On the other hand, if the temperature of the glass melt at the inlet of the float bath exceeds 1,250° C., defects due to molten tin tend to attach to the glass surface. Namely, if molten tin evaporates, tin aggregates in the upper space over the float bath, aggregated tin drops on the top surface of glass, and dotted form defects, namely top speck defects are formed. Further, if molten tin is oxidized, unsettled form tin oxide is formed, and if tin oxide attaches to the bottom surface of glass, dross defects are formed. Such defects are removed by polishing the glass substrate surface after the float process, however, considering reducing the amount of polishing, it is preferred to reduce such defects. In order to suppress dross or top speck, it is effective to lower the temperature of the glass melt at the inlet of the float bath. Specifically, the temperature of the glass melt at the inlet of the float bath is preferably at most 1,250° C., more preferably at most 1,245° C.

Further, the glass may be formed by a known method other than the float process. As another forming method, specifically, a known roll out method, down draw method or fusion method may, for example, be mentioned. The glass substrate of the present invention is particularly suitable as a thin large size glass substrate, for example, a glass substrate for a liquid crystal display, of which plate thickness is from 0.3 to 1.1 mm, one side is at least 2 m, and the other side is at least 1.8 m.

Further, the present invention provides a liquid crystal display panel comprising the glass substrate of the present invention as a glass substrate. For example, in a case where the liquid crystal display panel is a thin film transistor liquid crystal display (TFT-LCD), it has an electrode substrate for a display (an array substrate) having a gate electrode line and an oxide layer for gate insulation formed thereon and further having a pixel electrode formed on the surface of the oxide layer, and a color filter substrate having an RGB color filter and a counter electrode formed thereon. And in between a pair of the array substrate and the color filter substrate, a liquid crystal material is interposed to constitute a cell. In addition to such a cell, the liquid crystal display panel contains other elements such as peripheral circuits. In the liquid crystal display panel of the present invention, the glass of the present invention is used for at least one of the pair of the substrates constituting the cell.

EXAMPLES

Now, Example of the present inventions are shown.

Examples 1 to 8

First, starting materials of the respective components were mixed so that glasses after the formation have compositions (mol %) shown in Tables 1 and 2, and melted at a temperature of from 1,550 to 1,620° C. by means of a platinum crucible. At the time of melting, stirring was carried out by means of a platinum stirrer to homogenize the glass. Then, the molten glass was cast as it was to form a substrate having a desired thickness, and then annealed to obtain the glass in each of Examples 1 to 8.

Further, Table 3 shows weight % of the compositions which are represented by mol % in Tables 1 and 2.

Tables 1 and 2 show, as properties of the obtained glass, the Young's modulus (GPa), the density (g/cm$^3$), the linear expansion coefficient at from 50 to 350° C. (the average linear expansion coefficient ($10^{-7}$/° C.)), the strain point (° C.), as an index of the high temperature viscosity, the temperature $T_2$ (° C.) at which the viscosity η satisfies log η=2 (dPa·s)), which is an index of the melting property and the temperature $T_4$ (° C.) at which the viscosity η satisfies log η=4 (dPa·s)), which is an index of the float forming property, the devitrification temperature (° C.) and the acid resistance (weight loss per unit area, when immersed in 0.1N HCl at 90° C. for 20 hours). Among values shown in Tables 1 and 2, values described in two sections mean that a value in the upper section is a calculated value, and a value in the lower section is a value actually measured by the above method. Further, the melting temperature of the materials in Examples 4 to 8 was 1,600° C.

Calculation of the property values in Examples 1 to 8 was carried out by obtaining a contribution degree $a_i$ for each property (I=1 to 6 (respective glass components (six components of $SiO_2$, $Al_2O_3$, $B_2O_3$, MgO, CaO and SrO))) by regression calculation, followed by calculating $\Sigma a_i X_i + b$ ($X_i$ is a mol percentage of each component, and b is a constant number).

As shown in Tables 1 and 2, in the glasses in Examples 1 to 8, the Young's modulus is at least 75 GPa, preferably at least 79 GPa, the linear expansion coefficient at from 50 to 350° C. is from $30 \times 10^{-7}$/° C. to $40 \times 10^{-7}$/° C., the strain point is at least 640° C., the density is at most 2.60 g/cm$^3$, and weight loss per unit area as an index of the acid resistance is at most 0.6 mg/cm$^2$, when immersed in 0.1N HCl at 90° C. for 20 hours. It is thereby evident that the glasses in Examples 1 to 8 are excellent in properties as a glass substrate for a display. Further, since in the glasses in Examples 1 to 8, $T_2$, which is an index of the melting property is lower than 1,630° C., preferably at most 1,620° C., they are excellent in the glass melting property. Further, since in the glasses in Examples 1 to 8, $T_4$, which is an index of the melting property is lower than 1,260° C., preferably at most 1,250° C., more preferably at most 1,245° C., further preferably at most 1235° C., and the devitrification temperature is at most $T_4$, they are alkali-free glass substrates suitable for the float process for forming glass.

TABLE 1

|  |  | Ex. 1 | Ex. 2 | Ex. 3 |
|---|---|---|---|---|
| $SiO_2$ |  | 63.5 | 64.5 | 63.0 |
| $Al_2O_3$ |  | 11.0 | 11.5 | 10.5 |
| $B_2O_3$ |  | 7.5 | 7.5 | 8.5 |
| MgO |  | 8.0 | 7.0 | 8.0 |
| CaO |  | 7.0 | 6.0 | 7.0 |
| SrO |  | 3.0 | 3.5 | 3.0 |
| BaO |  | 0 | 0 | 0 |
| MgO + CaO + SrO |  | 18.0 | 16.5 | 18.0 |
| MgO/(MgO + CaO + SrO) |  | 0.444 | 0.424 | 0.444 |
| $B_2O_3/(SiO_2 + Al_2O_3 + B_2O_3)$ |  | 0.091 | 0.090 | 0.104 |
| Young's modulus (GPa) | Calculated value | 80 | 80 | 79 |
|  | Actually measured value | 81 | 79 | 80 |
| Density (g/cm³) | Calculated value | 2.51 | 2.50 | 2.50 |
|  | Actually measured value | 2.51 | 2.50 | 2.50 |
| Linear expansion coefficient ($\times 10^{-7}$/° C.) | Calculated value | 39 | 37 | 39 |
|  | Actually measured value | 38.3 | 36.2 | 37.7 |
| Strain point (° C.) | Calculated value | 660 | 660 | 650 |
|  | Actually measured value | — | — | — |
| $T_2$ (° C.) | Calculated value | 1590 | 1620 | 1580 |
|  | Actually measured value | — | 1615 | — |
| $T_4$ (° C.) | Calculated value | 1220 | 1240 | 1200 |
|  | Actually measured value | — | 1240 | — |
| Devitrification temperature (° C.) | Actually measured value | — | — | — |
| Acid resistance (mg/cm²) | Actually measured value | 0.15 | 0.12 | 0.25 |

TABLE 2

|  |  | Ex. 4 | Ex. 5 | Ex. 6 | Ex. 7 | Ex. 8 |
|---|---|---|---|---|---|---|
| $SiO_2$ |  | 63.6 | 64.0 | 64.1 | 64.0 | 64.2 |
| $Al_2O_3$ |  | 11.6 | 11.0 | 10.9 | 10.8 | 10.8 |
| $B_2O_3$ |  | 7.5 | 7.5 | 7.5 | 7.5 | 7.5 |
| MgO |  | 8.0 | 8.0 | 7.0 | 7.5 | 7.5 |
| CaO |  | 7.0 | 7.0 | 8.0 | 7.7 | 7.0 |
| SrO |  | 2.5 | 2.5 | 2.5 | 2.5 | 3.0 |
| BaO |  | 0 | 0 | 0 | 0 | 0 |
| MgO + CaO + SrO |  | 17.4 | 17.5 | 17.5 | 17.7 | 17.5 |
| MgO/(MgO + CaO + SrO) |  | 0.457 | 0.457 | 0.400 | 0.424 | 0.429 |
| $B_2O_3/(SiO_2 + Al_2O_3 + B_2O_3)$ |  | 0.090 | 0.091 | 0.091 | 0.091 | 0.091 |
| Young's modulus (GPa) | Calculated value | 81 | 80 | 80 | 80 | 80 |
|  | Actually measured value | 80 | 80 | 80 | 80 | 80 |
| Density (g/cm³) | Calculated value | 2.49 | 2.49 | 2.49 | 2.49 | 2.50 |
|  | Actually measured value | 2.49 | 2.49 | 2.49 | 2.49 | 2.50 |
| Linear expansion coefficient ($\times 10^{-7}$/° C.) | Calculated value | 37 | 38 | 38 | 38 | 38 |
|  | Actually measured value | 36.5 | 37.2 | 37.9 | 37.7 | 37.2 |
| Strain point (° C.) | Calculated value | 660 | 660 | 660 | 660 | 660 |
|  | Actually measured value | 665 | 664 | 664 | 663 | 663 |
| $T_2$ (° C.) | Calculated value | 1595 | 1600 | 1600 | 1600 | 1605 |
|  | Actually measured value | 1600 | 1595 | 1595 | 1590 | 1600 |
| $T_4$ (° C.) | Calculated value | 1225 | 1225 | 1230 | 1225 | 1225 |
|  | Actually measured value | 1230 | 1230 | 1225 | 1220 | 1230 |
| Devitrification temperature (° C.) | Actually measured value | 1225 | — | — | — | 1230 |
| Acid resistance (mg/cm²) | Actually measured value | 0.18 | 0.15 | — | — | 0.18 |

TABLE 3

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 58.8 | 59.2 | 58.5 | 58.9 | 59.5 | 59.5 | 59.5 | 59.5 |
| $Al_2O_3$ | 17.3 | 17.9 | 16.5 | 18.2 | 17.4 | 17.2 | 17.0 | 17.0 |
| $B_2O_3$ | 8.1 | 8.0 | 9.1 | 8.0 | 8.1 | 8.1 | 8.1 | 8.0 |
| MgO | 5.0 | 4.3 | 5.0 | 4.9 | 5.0 | 4.4 | 4.7 | 4.7 |
| CaO | 6.1 | 5.1 | 6.1 | 6.0 | 6.1 | 6.9 | 6.7 | 6.1 |
| SrO | 4.8 | 5.5 | 4.8 | 4.0 | 4.0 | 4.0 | 4.0 | 4.8 |
| BaO | 0 | 0 | 0 | 0 | 0 | 0 | 0 | 0 |

Examples 9 to 11

Table 4 shows the composition of the glass components prepared as glass materials for industrial glass, and Table 5 shows the composition of the obtained glass.

Here, compositions of $SiO_2$, $Al_2O_3$, $B_2O_3$, MgO, CaO, SrO and BaO are represented by mol %, and each content to the total amount of $SiO_2$, $Al_2O_3$, $B_2O_3$, MgO, CaO, SrO and BaO is represented by weight percentage. Table 5 shows as properties of the obtained glass, the Young's modulus (GPa), the density (g/cm³), the linear expansion coefficient at from 50 to 350° C. (the average linear expansion coefficient ($10^{-7}$/° C.)), the strain point (° C.) as an index of the high temperature viscosity, the temperature $T_2$ (° C.) (the viscosity η satisfies log η=2 (dPa·s)), which is an index of the melting property and the temperature $T_4$ (° C.) (the viscosity η satisfies log η=4 (dPa·s)), which is an index of the float forming property, the devitrification temperature (° C.) and the acid resistance (weight loss per unit area, when immersed in 0.1N HCl at 90° C. for 20 hours). These values are values actually measured by the method described in Examples 1 to 8.

In Examples 9 to 11, a half amount (about 125 g calculated as glass) of the glass materials of the composition shown in Table 4 was charged in a 300 cc platinum crucible and left in an electric furnace at 1,500° C. for 30 minutes, and then the platinum crucible was once removed from the electric furnace, the rest half amount of ((about 125 g calculated as glass) was added, and the platinum crucible was left in the electric furnace at 1,500° C. for 30 minutes again to melt the materials. Then, the platinum crucible was quickly transferred to an electric furnace at 1,590° C. and left for 30 minutes. Then, the platinum crucible was transferred to an electric furnace at 730° C., and glass was annealed to 610° C. over 2 hours and further annealed to room temperature over about 10 hours.

Further, with respect to each glass in Examples 9 to 11, glass at the upper center in the crucible was hollowed into a column glass having a diameter of 38 mm and a height of 35 mm, and the column glass was cut into a glass substrate containing its central axis and having a thickness of 2 to 5 mm. Both surfaces of the cut glass were optically polished (mirror polished). With respect to a part of glass corresponding to from 1 to 10 mm from the upper surface of glass in the crucible, an optically polished surface was observed by a stereoscopic microscope, the number of bubbles having a diameter of at least 50 μm in the glass was counted, and its value was divided by the volume of the glass substrate to obtain bubble numbers. The results are shown in Table 5.

Table 5 shows that in the case of the glass containing $SnO_2$ in Examples 10 and 11, the number of bubbles in the glass was less than that in the glass containing no $SnO_2$ in Example 9. Therefore, it is evident that it is preferred that $SnO_2$ is contained in glass materials as a fining agent.

Further, Sn-redox in Example 11 was 16%. Sn-redox is a value obtained by measuring the amount of $Sn^{2+}$ in glass at a room temperature by Sn-mossbauer spectrometry and calculating [the amount of $sn^{2+}$/the total amount of Sn]. Sn-redox is preferably from 15 to 40%, more preferably from 15 to 30%.

Sn-mossbauer spectrometry measuring method is explained.

γ radiation (23.8 keV) generated along with the energy transition of from $^{119m}Sn$ to $^{119}Sn$ was proved, and the existence ratio of bivalent Sn and tetravalent Sn (Sn-redox) was measured by a transmission method (γ radiation transmitted through a glass sample was measured). Specifically, the method is as shown below.

An irradiation nozzle of γ radiation of a radiation source, a glass sample, a Pd filter, a photoreceptor portion of a gas amplification proportional counter tube (product No. 45431, manufactured by LND) were placed on a straight line of 300 to 800 mm length.

10 mCi of $^{119m}Sn$ was used as the radiation source, and the radiation source was moved in the axis direction of optical system, and energy of γ radiation was changed by Doppler effect. Velocity of the radiation source was controlled to vibrate in the axis direction of optical system at the speed of −10 to +10 mm/sec by using a transducer (manufactured by TOYO research).

As the glass sample, a glass substrate obtained by polishing the above-obtained glass to a thickness of from 3 to 7 mm, was used.

The Pd filter was used to improve counter accuracy of γ radiation by the gas amplification proportional counter tube, and it is a Pd foil having a thickness of 50 μm used to remove specific X radiation generated from the glass sample at a time of irradiating the glass sample with γ radiation.

The gas amplification proportional counter tube was used to detect received γ radiation. Electric signal showing the amount of γ radiation from the gas amplification proportional counter tube was amplified by an amplification apparatus (manufactured by Kansai Electronics Co., Ltd.) to detect photoreceived signal. The above speed information was linked by multichannel analyzer (manufactured by Wissel, CMCA550).

Spectrum was obtained by representing detected signal from the gas amplification proportional counter tube on the vertical axis and velocity of the moving radiation source on the horizontal axis (Basic and Application of the Mossbauer Spectrometry, page 45 to 64, coauthors Hirotoshi Sato and Motoki Katada, Japan Scientific Societies Press). Two days to 16 days estimation time was required to obtain signals and noise ratio which can be evaluated.

A peak which appears at the vicinity of 0 mm/sec shows the existence of tetravalent Sn, and a peak split in two, which appears at the vicinity of 2.5 mm/sec and 4.5 mm/sec shows the existence of bivalent Sn. The ratio of raising respective peak areas to the correction coefficient (Journal of Non-Crystalline Solids 337 (year 2004) page 232-240 "The effect of alumina on the $Sn^{2+}/Sn^{4+}$ redox equilibrium and the incorporation of tin in $Na_2O/Al_2O_3/SiO_2$ melts" Darja Benner, coauthors) was calculated, and the ratio of bivalent Sn was obtained as Sn-redox value.

TABLE 4

|  | Ex. 9 | Ex. 10 | Ex. 11 |
|---|---|---|---|
| $SiO_2$ | 63.9 | 63.9 | 63.4 |
| $Al_2O_3$ | 10.7 | 10.7 | 11.5 |
| $B_2O_3$ | 7.9 | 7.9 | 7.8 |
| MgO | 7.5 | 7.5 | 7.9 |
| CaO | 7.0 | 7.0 | 6.9 |
| SrO | 3.0 | 3.0 | 2.5 |
| BaO | 0.0 | 0.0 | 0.0 |
| F | 0.14 | 0 | 0.14 |
| Cl | 0.5 | 0 | 0.5 |
| $SO_3$ | 0.36 | 0 | 0.36 |
| $Fe_2O_3$ | 0.05 | 0.05 | 0.05 |
| $SnO_2$ | 0.0 | 0.5 | 0.2 |

TABLE 5

|  | Ex. 9 | Ex. 10 | Ex. 11 |
|---|---|---|---|
| $SiO_2$ | 64.2 | 64.2 | 63.6 |
| $Al_2O_3$ | 10.8 | 10.8 | 11.6 |
| $B_2O_3$ | 7.5 | 7.5 | 7.5 |
| MgO | 7.5 | 7.5 | 7.9 |
| CaO | 7.0 | 7.0 | 6.9 |
| SrO | 3.0 | 3.0 | 2.5 |
| BaO | 0.0 | 0.0 | 0.0 |
| MgO + CaO + SrO | 17.5 | 17.5 | 17.3 |
| MgO/(MgO + CaO + SrO) | 0.429 | 0.429 | 0.457 |
| $B_2O_3/(SiO_2 + Al_2O_3 + B_2O_3)$ | 0.091 | 0.091 | 0.091 |
| F | 0.04 | 0 | 0.04 |
| Cl | 0.14 | 0 | 0.13 |
| $SO_3$ | 0.001 | 0 | 0.001 |
| $Fe_2O_3$ | 0.05 | 0.05 | 0.05 |
| $SnO_2$ | 0.0 | 0.4 | 0.17 |
| Young's modulus (GPa) | 80 | 80 | 80 |
| Density (g/cm$^3$) | 2.50 | 2.50 | 2.49 |
| Linear expansion coefficient ($\times 10^{-7}$/° C.) | 37.2 | 37.2 | 38.0 |
| Strain point (° C.) | 663 | 663 | 662 |
| $T_2$ (° C.) | 1600 | 1600 | 1600 |
| $T_4$ (° C.) | 1230 | 1230 | 1230 |
| Number of remaining bubbles (piece/cm$^3$) | 130 | 10 | 15 |

Materials were prepared so as to be the composition of Example 9 shown in Table 4, and the materials were melted to be molten glass, followed by carrying out the float process. The temperature of the molten glass at the inlet of the float bath was lowered to from 1,260° C. to 1,240° C. As a result, the number of formed dross was reduced to ⅖, and the number of formed top speck was reduced to ⅕. Further, without devitrification, etc., the float process was stably carried out.

In the case of the glass plate of the present invention, even though it is a large glass having a rectangular shape of at least 2 m on one side, deflection is little, whereby the glass of the present invention can be transported and handled in the same manner as in the case of a rectangular glass plate having at least 1 m on one side, and it is suitable for a glass substrate required for obtaining multiple substrates for a liquid crystal display panel.

INDUSTRIAL APPLICABILITY

The alkali-free glass plate of the present invention is useful as a glass substrate for a liquid crystal display panel, particularly as a large glass substrate, and a liquid crystal display panel which is highly fine and having a high contrast ratio.

The entire disclosures of Japanese Patent Application No. 2006-193278 filed on Jul. 13, 2006, Japanese Patent Application No. 2006-301674 filed on Nov. 7, 2006 and Japanese Patent Application No. 2006-356287 filed on Dec. 28, 2006 including specifications, claims and summaries are incorporated herein by reference in their entireties.

What is claimed is:

1. An alkali metal-free glass substrate, comprising substantially no alkali component or BaO and consisting essentially of, as represented by mol% based on oxide, from 57.0 to 65.0% of $SiO_2$, from 10.0 to 12.0% of $Al_2O_3$, from 6.0 to 9.0% of $B_2O_3$, from 5.0 to 10.0% of MgO, from 6.0 to 8.0% of CaO and from 2.5 to 5.5% of SrO, provided that MgO+CaO+SrO is from 16.0 to 19.0%, MgO/(MgO+CaO+SrO)≧0.40, and $B_2O_3/(SiO_2+Al_2O_3)$≦0.12; wherein Young's modulus ≧75 GPa; the linear expansion coefficient at from 50 to 350° C. is from $30\times10^{-7}$/° C. to $40\times10^{-7}$/° C.; the strain point ≧640° C.; the temperature $T_2$ (the viscosity η satisfies logη=2) is at least 1,580° C. and at most 1,620° C.; the temperature $T_4$ (the viscosity η satisfies logη=4) ≦1,245° C.; the devitrification temperature ≦$T_4$; and weight loss per unit area is at most 0.2 mg/cm², when immersed in 0.1N HCl at 90° C. for 20 hours.

2. The alkali metal-free glass substrate according to claim 1, consisting essentially of, as represented by mol% based on oxide, from 60.0 to 65.0% of $SiO_2$, from 10.0 to 12.0% of $Al_2O_3$, from 6.0 to 9.0% of $B_2O_3$, from 5.5 to 8.5% of MgO, from 5.0 to 10.0% of CaO and from 2.5 to 5.5% of SrO, provided that MgO+CaO+SrO is from 16.0 to 18.5%, MgO/(MgO+CaO+SrO) ≧0.40, and $B_2O_3/(SiO_2+Al_2O_3+B_2O_3)$≦0.12.

3. The alkali metal-free glass substrate according to claim 1, further comprising from 500 ppm to 1.0 weight % of $SnO_2$.

4. A liquid crystal display panel, comprising at least one alkali metal-free glass substrate as defined in claim 1.

5. A method for producing an alkali metal-free glass substrate, comprising:
melting a glass material so as to form a glass composition which comprises neither alkali component nor BaO and consists essentially of, as represented by mol % based on oxide, from 57.0 to 65.0% of $SiO_2$, from 10.0 to 12.0% of $Al_2O_3$, from 6.0 to 9.0% of $B_2O_3$, from 5.0 to 10.0% of MgO, from 6.0 to 8.0% of CaO and from 2.5 to 5.5% of SrO, provided that MgO+CaO+SrO is from 16.0 to 19.0%; MgO/(MgO+CaO+SrO) ≧0.40, and $B_2O_3/(SiO_2+Al_2O_3+B_2O_3)$ ≦0.12, followed by
forming said alkali-free glass substrate by a float process, wherein the temperature to melt the glass material is lower than 1,630° C., and the maximum temperature of the glass melt at an inlet of a float bath is 1,250° C.

6. The method for producing an alkali metal-free glass substrate according to claim 5, comprising:
melting a glass material so as to form a glass composition which comprises neither alkali component nor BaO and consists essentially of, as represented by mol % based on oxide, from 60.0 to 65.0% of $SiO_2$, from 10.0 to 12.0% of $Al_2O_3$, from 6.0 to 9.0% of $B_2O_3$, from 5.5 to 8.5% of MgO, from 5.0 to 10.0% of CaO and from 2.5 to 5.5% of SrO; MgO+CaO+SrO is from 16.0 to 18.5%, MgO/(MgO+CaO+SrO) ≧0.40, and $B_2O_3/(SiO_2+Al_2O_3+B_2O_3)$ ≦0.12, followed by
forming by a float process, wherein the temperature to melt the glass material is lower than 1,620° C., and the maximum temperature of the glass melt at an inlet of a float bath is 1,245° C.

7. The method for producing an alkali metal-free glass substrate according to claim 5, wherein the glass material comprises from 0.1 to 1.0 weight % of $SnO_2$.

8. The method for producing an alkali metal-free glass substrate according to claim 5, wherein the glass material further comprises from 0.1 to 1.0 weight % of $SnO_2$, and the method comprises
heating the glass material at a temperature of from 1,450 to 1,580° C. to form molten glass, and
subsequent to forming the molten glass, heating the molten glass at a temperature of at least 1,500° C. and lower than 1,630° C. to remove bubbles, wherein the temperature of the molten glass to remove bubbles is higher by at least 30° C. than the temperature of the molten glass to be formed.

* * * * *